US008203985B2

(12) United States Patent
Gong et al.

(10) Patent No.: US 8,203,985 B2
(45) Date of Patent: Jun. 19, 2012

(54) POWER SAVING IN PEER-TO-PEER COMMUNICATION DEVICES

(75) Inventors: Michelle Xiaohong Gong, Sunnyvale, CA (US); Adrian P. Stephens, Cambridge (GB); Mark Jalfon, Haifa (IL); Tsung-Yuan Charles Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 12/317,969

(22) Filed: Dec. 31, 2008

(65) Prior Publication Data

US 2010/0165896 A1 Jul. 1, 2010

(51) Int. Cl.
*H04W 52/00* (2009.01)
(52) U.S. Cl. ...................................... 370/311
(58) Field of Classification Search .................. 370/311
See application file for complete search history.

(56) References Cited

U.S. PATENT DOCUMENTS

| | | | |
|---|---|---|---|
| 7,085,595 | B2 | 8/2006 | Kitchin |
| 7,251,235 | B2 | 7/2007 | Wentink |
| 2005/0122927 | A1 | 6/2005 | Wentink |
| 2005/0135304 | A1 | 6/2005 | Wentink et al. |
| 2006/0165035 | A1 | 7/2006 | Chandra et al. |
| 2006/0264214 | A1 | 11/2006 | Stanwood et al. |
| 2007/0281720 | A1 | 12/2007 | Lee |
| 2008/0219228 | A1 | 9/2008 | Seok et al. |
| 2009/0196211 | A1* | 8/2009 | Wentink .................. 370/311 |
| 2009/0196212 | A1* | 8/2009 | Wentink .................. 370/311 |
| 2010/0008274 | A1* | 1/2010 | Kneckt et al. ............. 370/311 |
| 2011/0117855 | A1* | 5/2011 | Salo et al. ................ 455/63.4 |
| 2011/0188429 | A1* | 8/2011 | Seok ....................... 370/311 |
| 2012/0014305 | A1* | 1/2012 | Kakani et al. ............ 370/311 |

FOREIGN PATENT DOCUMENTS

| | | |
|---|---|---|
| CN | 101801071 A | 8/2010 |
| WO | 2009/069490 A1 | 6/2009 |

OTHER PUBLICATIONS

International Search Report and Written Opinion received for PCT Application No. PCT/US2009/069490, mailed on Aug. 16, 2010, 9 pages.

* cited by examiner

*Primary Examiner* — Chi Pham
*Assistant Examiner* — Ahmed Elallam
(74) *Attorney, Agent, or Firm* — Schubert Law Group PLLC (57) ABSTRACT

Apparatuses, systems, methods, and computer program products to save power in peer-to-peer communication devices associated with wireless communication networks are disclosed. Embodiments generally comprise wireless communications devices. A device may associate or connect with an access point and communicate with another device also connected to the access point. The devices may establish a direct link as part of a tunneled direct link system (TDLS) network. After establishing the direct link, the devices may negotiate a wakeup schedule, enabling both devices to enter power saving modes to conserve power. The devices may maintain the direct link while in power saving modes, enabling the devices to periodically exit the power saving modes and transfer buffered data.

25 Claims, 8 Drawing Sheets

| ORDER | INFORMATION | NOTES |
|---|---|---|
| 1 | Link Identifier | The Link Identifier may be specified in section 7.3.2.z1 of 802.11z D1.0 |
| 2 | Dialog Token | The Dialog Token may be set to a non-zero value that is unique among TDLS PSM Request frames for which a corresponding TDLS Switch Response frame has not been received. |
| 3 | Wakeup Schedule IE | The Wakeup Schedule IE may describe the schedule for the wakeup period (See Table 350). |

| | ELEMENT ID | LENGTH | START TIME | INTERVAL | DURATION OF AWAKE WINDOW | IDLE COUNT |
|---|---|---|---|---|---|---|
| OCTETS | 1 | 1 | 4 | 4 | 4 | 2 |

| ORDER | INFORMATION | NOTES |
|---|---|---|
| 1 | Link Identifier | The Link Identifier may be specified in section 7.3.2.z1 of 802.11z D1.0 |
| 2 | Dialog Token | The Dialog Token may be set to a non-zero value contained in the TDLS PSM Request frames to identify the request/response transaction. |
| 3 | Status | The Status identifies the status of the response (See Table 380). |

| STATUS | INFORMATION |
|---|---|
| 0 | Accept |
| <ANA> | Wakeup Schedule rejected but alternative schedule provided |
| <ANA> | Wakeup Schedule rejected |

POWER SAVING IN PEER-TO-PEER COMMUNICATION DEVICES

FIELD

The embodiments herein are in the field of communications. More particularly, the embodiments relate to saving power for peer-to-peer communication devices, such as devices associated with wireless communication networks.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

The following is a detailed description of embodiments depicted in the accompanying drawings. The specification is in such detail as to clearly communicate the embodiments. However, the amount of detail offered is not intended to limit the anticipated variations of embodiments. To the contrary, the intention is to cover all modifications, equivalents, and alternatives consistent with the spirit and scope of the embodiments as defined by the appended claims.

Generally speaking, apparatuses, systems, methods, and computer program products to save power in peer-to-peer communication devices associated with wireless communication networks are contemplated. A system embodiment may be a mobile computing device with wireless communications capabilities. The mobile computing device may associate or connect with an access point and communicate with another communication device also connected to the access point. The mobile computing device and the other communication device may establish a direct link as part of a tunneled direct link system (TDLS) network. After establishing the direct link, the mobile computing device and the other communication device may negotiate a wakeup schedule, enabling both devices to enter power saving modes to conserve power. However, both devices may maintain the direct link while in power saving modes, enabling the devices to periodically exit the power saving modes and transfer buffered data without relying on the access point.

Various embodiments disclosed herein may be used in a variety of applications. Some embodiments may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3 GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA), Multi-Carrier Modulation (MDM), Discrete Multi-Tone (DMT), Bluetooth®, ZigBee™, or the like. Embodiments may be used in various other apparatuses, devices, systems and/or networks.

Figure 1:
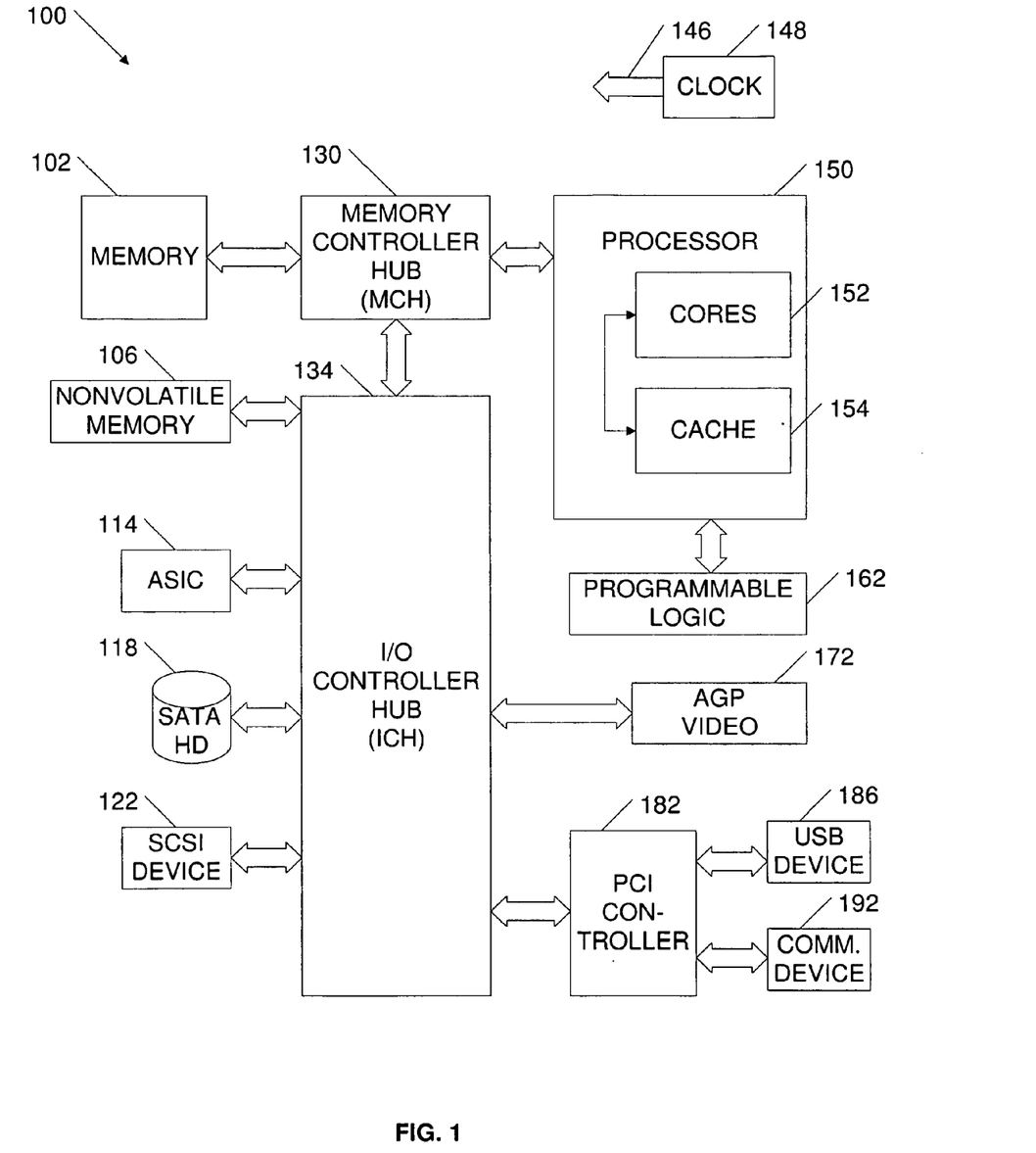
FIG. 1 depicts a system that may employ various peer-to-peer power saving techniques.

Turning now to the drawings, FIG. 1 depicts a system 100 with a processor 150, a memory controller hub (MCH) 130, memory 102, and an I/O controller hub (ICH) 134. In some embodiments system 100 may comprise a computer system, such as a notebook or a desktop computer. In other embodiments system 100 may comprise a different type of computing apparatus, such as a palmtop computer, a personal digital assistant (PDA), or a mobile computing device, as examples.

Processor 150 may have one or more cores 152 coupled with cache 154. For example, processor 150 may have four cores coupled with internal processor cache memory. Processor 150 may receive a clock signal from clock 148 via clock bus 146. Processor 150 may execute operating instructions for programs and applications executed by users of system 100, such as instructions of a word processing application, a computer aided design (CAD) application, or a web browser, as just a few examples. Such software programs and related instructions may be stored in memory 102. Processor 150 may execute the instructions in memory 102 by interacting with MCH 130. The types of memory devices comprising memory 102 may vary in different embodiments. In some embodiments, memory 102 may comprise volatile memory elements, such as two 1-gigabyte (GB) dynamic random access memory (DRAM) sticks. In other embodiments, memory 102 may comprise nonvolatile memory. For example in some embodiments memory 102 may comprise a flash memory module, such as a 4 GB flash memory card.

ICH 134 may allow processor 150 to interact with external peripheral devices, such as keyboards, scanners, and data storage devices. Programs and applications being executed by processor 150 may interact with the external peripheral devices. Processor 150, memory 102, and the various devices coupled to ICH 134 may all consume various amounts of power. To conserve power, system 100 may enter one or more various modes to save or conserve power. For example, in at least one embodiment, system 100 may shut down three cores of cores 152 and only run on one core of processor 150 to conserve power.

Alternatively, system 100 may conserve power by switching one or more cores of cores 152 to different power levels. For example, in one embodiment each core of cores 152 may be operated within six different power levels. A first power level may be referred to as "Power Level 0", a second power level referred to as "Power Level 1", and so on up to "Power Level 5" for a sixth power level. These different power levels are for one embodiment. Other embodiments may have more or fewer predefined power levels and/or power saving modes. In some embodiments, the power switching may be accomplished solely via the actions of processor 150 as processor 150 executes. Alternatively, in some embodiments, programmable logic 162 may assist or cause processor 150 to switch between the power saving modes.

When operating at one power level, such as Power Level 5, a core may be operating in a relatively unrestricted fashion. In other words, the power level may provide the core with all the power that it needs to process instructions as rapidly as it is able. Operating unrestricted in such a manner, however, may result in the core consuming large quantities of current and associated power. Conversely, when a core operates at a different power level, such as Power Level 0, it may operate much more slowly and process far fewer instructions than Power Level 5. Operating in this more restricted mode may allow the core to operate using a much smaller current. However, operating more slowly may result in the performance of the core being reduced. For example, if all cores of cores 152 operate at Power Level 1 or lower, system 100 may not be able to support certain operations of system 100, such as the operation of one or more peripheral devices like universal serial device 186 and communication device 192. System 100 may, however, buffer data which may later be transferred to another device when system 100 switches to a different power level and operates USB device 186 and/or communications device 192.

Processor 150 may present information to a user via a display device coupled to Advanced Graphics Port (AGP) video card 172. For example, the type of display device may be a cathode-ray tube (CRT) monitor, a liquid crystal display (LCD) screen, or a thin-film transistor flat panel monitor. To conserve power in one or more embodiments, system 100 may disable or otherwise switch video card 172 and/or the display device into a low power mode. Worth emphasizing, in various embodiments, system 100 may conserve power by selectively shutting some down devices while leaving other devices operating. For example, communication device 192 may comprise a wireless network interface card (NIC), with system 100 comprising a notebook computer. The notebook computer may disable or switch communication device 192 into a power saving mode, yet still execute an application and display results of the application to a user via video card 172.

As alluded to above, ICH 134 may allow processor 150 to store and retrieve data from USB device 186 via a Peripheral Component Interconnect (PCI) controller 182. For example, processor 150 may transmit and retrieve data via USB device 186 while running an application, such as when USB device 186 comprises a wireless communications card coupled to system 100 via a USB port. To conserve power, system 100 may enter a doze state, or alternatively a lower power level mode, which disables the wireless communications card of USB device 186.

In addition to USB device 186 and communication device 192, ICH 134 may also interact with Advanced Technology Attachment (ATA) devices, such as ATA hard drives, compact disc (CD) drives, and digital versatile disc (DVD) drives. As shown in FIG. 1, system 100 may have a SATA hard drive 118 coupled to ICH 134. SATA hard drive 118 may be used to store an operating system, device drivers, and application software for system 100. For example, in some embodiments SATA hard drive 118 may store a Linux®, a Unix®, a Macintosh®, OS X, a Windows® or some other operating system. Additionally, when system 100 enters a power saving mode, SATA hard drive 118 may store state data so that system 100 may restore machine state using the saved data upon exiting the power saving mode. For example, SATA hard drive 118 may store state data comprising register values, cache data, contents of memory 102, and data pertaining to previously established links with one or more stations of a peer-to-peer network.

ICH 134 may store and retrieve information in nonvolatile memory 106, as well as interact with an application specific integrated circuit (ASIC) 114. For example, nonvolatile memory 106 may comprise flash memory in some embodiments while comprising programmable read-only memory (PROM) or another type of memory in other embodiments. In embodiments where nonvolatile memory 106 comprises flash memory, system 100 may store state information before entering a power saving mode and load the state information upon exiting the power saving mode. In embodiments where nonvolatile memory 106 comprises PROM, nonvolatile memory may be used, e.g., to store operating instructions for system 100. For example, nonvolatile memory 106 may store operating instructions when system 100 comprises, e.g., a mobile device such as a cellular telephone.

In one or more embodiments, ASIC 114 may work in conjunction with processor 150 and/or communication device 192. For example, system 100 may comprise a secure communication device, wherein ASIC 114 performs such functions as encryption and decryption of data transmitted and received via system 100. Upon entering a power saving mode, ASIC 114 may retain current state information of a direct link which system 100 may have established with another system or device, such as a current set of encryption keys, by saving the information in a nonvolatile memory section of ASIC 114, in nonvolatile memory 106, or SATA hard drive 118, as examples. Upon exiting the power saving mode, ASIC 114 may retrieve the state information and use it to communicate with the other system over the direct link.

In some embodiments ICH 134 may store and retrieve data using a Small Computer Systems Interface (SCSI) device 122. In such embodiments, system 100 may retain current state information for a direct link which system 100 may have established with another system, such as state information of processor 150 and memory 102, by saving the information in to a storage device coupled to SCSI device 122 before entering a power saving mode. Upon exiting the power saving mode, system 100 may retrieve the state information from the storage device of SCSI device 122 and use it the state information to continue communicating with the other system over the direct link.

In even further alternative embodiments, SCSI device 122 may comprise a communication device, such as a wireless communications card. In such embodiments, system 100 may use the wireless communications card to establish a direct link with another system, or station. System 100 may maintain the direct link with the other system, negotiate a schedule for entering a power saving mode, enter the doze state, exit the doze (state) according to the negotiated schedule, and transfer additional data between the two systems via the direct link.

As noted above, system 100 may employ clock 148 to generate a global clock signal for various elements of system 100. In various embodiments, circuits within each of the wireless communication devices may use the clock signal from clock 148 as part of scheduling for power conservation and resuming communications for the transfer of data. For example, system 100 may establish a direct link with another system, such as a peer-to-peer link in an 802.11 Tunneled Direct Link Setup (TDLS) network. (See http://standards-.ieee.org/getieee802/download/802.11-2007.pdf) Upon establishing the direct link, system 100 may use the signal from clock 148 to maintain an accurate measurement of time for system 100, relative to the timing synchronization function (TSF) of the access point for the local network. Upon entering the power saving mode, system 100 may continue to operate clock 148 and monitor the passage of time. When the time arrives for system 100 to exit the power saving mode, system 100 may wake and transfer data via the previously established direct link.

System 100, in other alternative embodiments, may comprise other types of hardware not depicted in FIG. 1, such as a sound card, a scanner, and a printer, as examples. Conversely, in different embodiments, system 100 may not comprise all of the elements used to illustrate the embodiment shown in FIG. 1. For example, numerous embodiments of system 100 may not comprise SCSI device 122, SATA hard drive 118, USB 186, and ASIC 114. Additionally, the embodiment of system 100 employing MCH 130 and ICH 134 may differ in other alternative embodiments. That is to say, alternative embodiments may employ other types of bus and/or hub arrangements.

Figure 2:
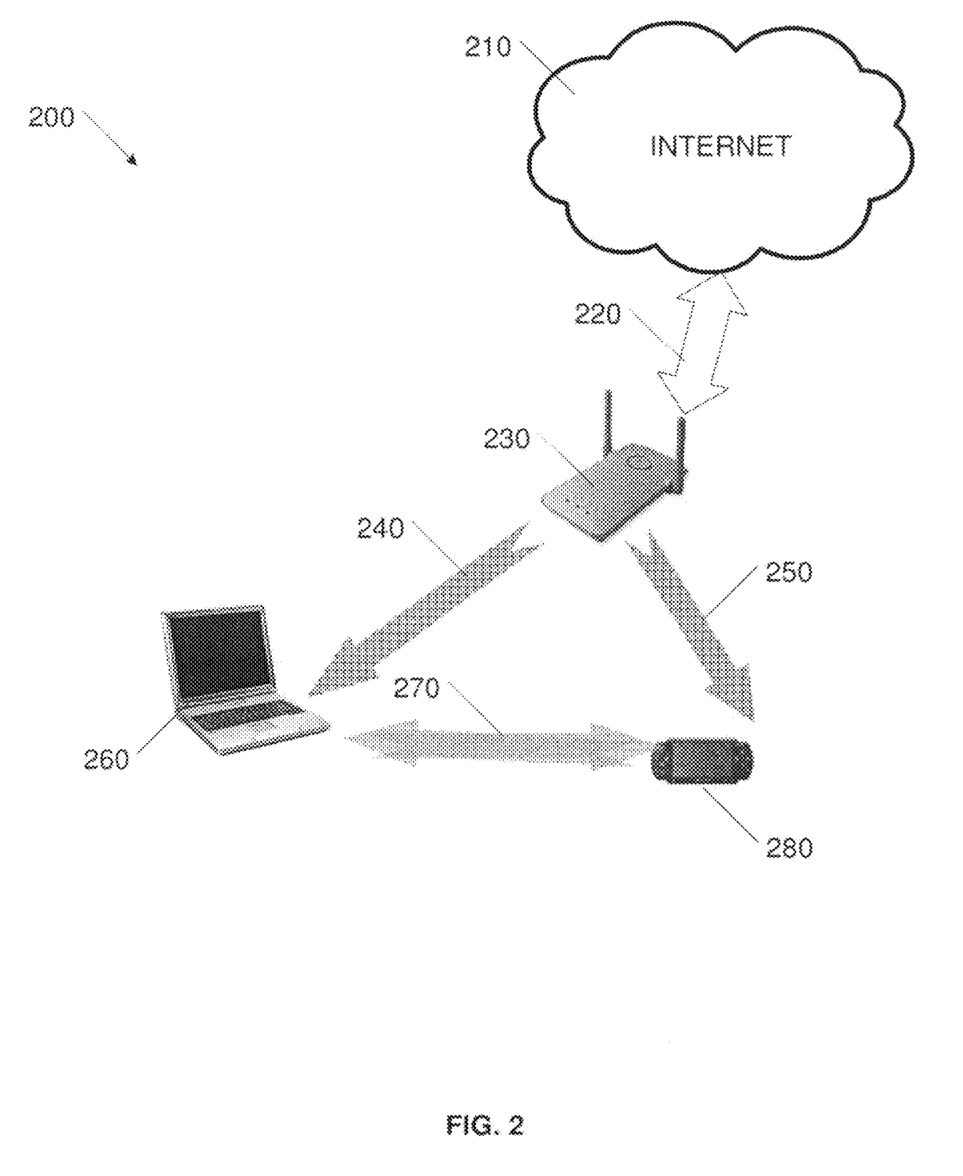
FIG. 2 illustrates how two peer-to-peer systems or devices of a communication network may conserve power upon establishing a direct link.

Moving now to FIG. 2, we see how two peer-to-peer systems or devices of a communication network 200, such as two separate systems 100, may conserve power, upon establishing a direct link 270 between laptop 260 and mobile device 280. For example, laptop 260 and mobile device 280 may have established access point links 240 and 250 with access point 230. Access point 230 may be coupled with the Internet 210 via link 220. Using link 240 and the connectivity provided by access point 230, laptop 260 may access the Internet 210. Using link 250, mobile device 280 may access the Internet 210.

As noted, laptop 260 and mobile device 280 may also be communicating in a peer-to-peer mode, with mobile device 280 and laptop 260 communicating with each other over direct link 270. Further, laptop 260 and mobile device 280 may each use battery power to operate. While still maintaining direct link 270, both laptop 260 and mobile device 280 may desire to save power and each enter power saving modes, simultaneously.

The types of devices in communication network 200 may vary in different embodiments. For example, in one alternative embodiment laptop 260 may comprise an ultra-mobile personal computer (UMPC). In other alternative embodiments, mobile device 280 may comprise a Mobile Internet Device (MID) or a smartphone. In an even further embodiment, laptop 260 may comprise a desktop computer employing an internal wireless network interface card (NIC) to communicate with mobile device 280 over direct link 270. In other words, laptop 260 and mobile device 280 may comprise different types of devices in different embodiments.

A single laptop and a single mobile device, as depicted in FIG. 2, may illustrate one scenario or arrangement of a communication network 200. In other embodiments, more devices may be involved in peer-to-peer communications in communication network 200. For example, mobile device 280 may be communicating with laptop 260 over direct link 270 and communicating with another mobile device over an additional direct link. Mobile device 280 may nonetheless conserve power while maintaining direct link 270 and the other direct link.

Laptop 260 and mobile device 280 may both implement power saving techniques in compliance with 802.11z. For example, laptop 260 may comply with Draft D1.0 of the Institute of Electrical and Electronics Engineers (IEEE) 802.11z standard and implement an 802.11 infrastructure mode power management scheme. In compliance with the power management scheme, laptop 260 may stay active at all times yet allow mobile device 280 to enter a power conservation mode.

In accordance with one or more of the embodiments disclosed herein, laptop 260 and mobile device 280 may also implement an alternative power conservation scheme. In the alternative power conservation scheme, both laptop 260 and mobile device 280 may each enter power conservation modes while still maintaining direct link 270. In other words, laptop 260 and mobile device 280 may implement a power management scheme that is completely distributed, which allows both laptop 260 and mobile device 280 to enter power saving modes at the same time. Further, the power management scheme may enable flexible scheduling of wakeup intervals, during which laptop 260 and mobile device 280 may exchange data frames.

One or more embodiments of communication network 200 may allow peer-based power management in an 802.11 TDLS network. For example, communication network 200 in FIG. 2 may comprise a TDLS peer-to-peer network with two computing devices, laptop 260 and mobile device 280, each comprising a station (STA) that creates direct link 270 to communicate with the other station. Once the two peer devices, or stations, have established direct link 270, the stations may communicate with each other via direct link 270 rather than through the access point 230. When at least one of the stations wants to save power while communicating over direct link 270, the station may trigger the peer-based power management mechanism. Worth noting, even though laptop 260 and/or mobile device 280 may trigger the peer-based power management mechanism, both laptop 260 and mobile device 280 may still maintain links 240 and 250 with access point 230.

The Peer Power Save Mode (PSM) provided for in 802.11z may not enable two peer-to-peer devices to simultaneously enter power saving modes. In other words, 802.11z may enable laptop 260 to enter a power saving mode while mobile device 280 stays active, or enable mobile device 280 to enter a power saving mode while laptop 260 stays active, but not provide a way to enable both laptop 260 and mobile device 280 to enter power saving modes simultaneously. That is to say, 802.11z may require one of the peer stations to stay active at all times to support the other station entering the power save mode. Because the PSM scheme of 802.11z does not provide a way for both stations to enter power saving modes at the same time, the PSM may not address a broad range of usage scenarios. However, in one or more of the embodiments described herein, multiple devices such as laptop 260 and mobile device 280 may each enter power saving modes and wake according to negotiated schedules to exchange data packets.

A peer station that intends to enter a power saving mode may transmit a TDLS Power Save Mode (PSM) Request frame to the other peer station. In one or more embodiments, the peer STATION may transmit a TDLS PSM Request frame with information defined by table 300 in FIG. 3A. The PSM Request frame may have three fields of information. A first field 305 may comprise a Link Identifier field, which may conform to section 7.3.2.z1 of 802.11z D1.0. A second field 310 may comprise a Dialog Token field that may contain a unique non-zero value for which a corresponding response has not been received. For example, a peer station may transmit three request frames during a negotiation represented by, e.g., the numbers 01, 02, and 03. The peer station may have received responses to request frames having Dialog Token values of 01 and 02. In transmitting the next request frame, the peer station may transmit "03" or other numbers besides "01" and "02" as part of the Dialog Token, field 310.

Figure 3A:
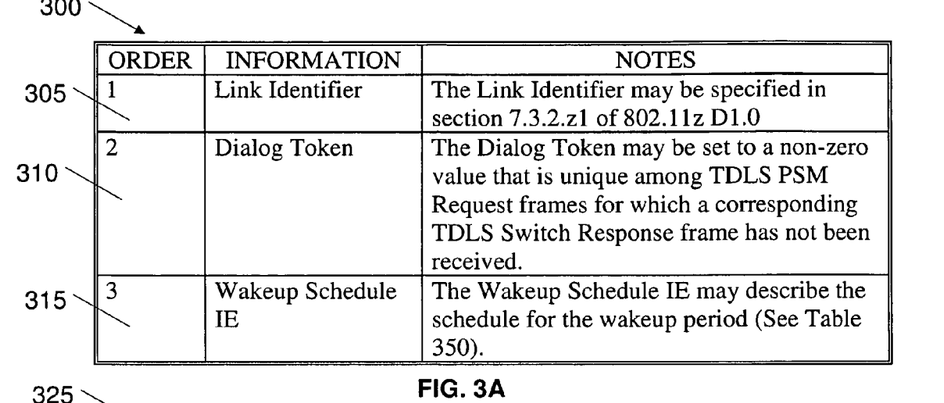
FIG. 3A shows information that may comprise a TDLS PSM Request frame.
Figure 3B:
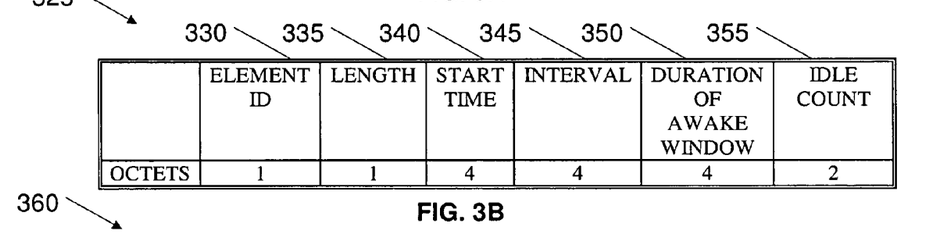
FIG. 3B depicts a table of information for what may be a wakeup schedule information element.

The peer station may also transmit a third field 315 as part of the TDLS PSM Request frame. Field 315 may describe the schedule that the requesting peer station proposes. In numerous embodiments, field 315 may be defined by table 325 as shown in FIG. 3B. Table 325 illustrates that a Wakeup Schedule information element (IE) may be further divided into an Element Identification (ID) field 330, a Length field 335, a Start Time field 340, an Interval field 345, a Duration of Awake Window field 350, and an Idle Count field 355. In other words, table 325 illustrates what may be an example frame format of the Wakeup Schedule IE.

Element Identification field 330 may contain a number corresponding to an individual Wakeup Schedule ID. In an embodiment according to table 325, Length field 335 is 1 octet long and has a value of 14, corresponding to the sum of 4, 4, 4, and 2 of Start Time field 340, Interval field 345, Duration of Awake Window field 350, and Idle Count field 355, respectively. In one or more embodiments, Start Time field 340 may comprise 4 octets and indicate the anticipated time, expressed in microseconds, when both stations should wake or exit the power saving modes. For example, Start Time field 340 may represent the lower-order 4 octets of the TSF timer value at the start of the first awake window.

Interval field 345 may be 4 octets and indicate the time, expressed in microseconds, between two successive wakeup periods. For example, Interval field 345 may represent the amount of time between two successive Awake Windows. Selecting a start time that is not a multiple of the gcd (interval, beacon interval) may ensure that a wakeup schedule will not coincide with the beacon schedule, which may be desirable. Duration of Awake Window 350 may be 4 octets and set to the duration of the Awake Window, in microseconds. Idle Count field 355 may be set to the number of consecutively empty Awake Windows before a peer STA deactivates and deletes the wakeup schedule.

In numerous embodiments, the access point TSF timer may provide the reference time for which the Start Time, Interval, and Duration of Awake Window times are based. For example, both peer stations may synchronize with the access point TSF timer and use the synchronized time to determine when to enter and exit the power saving modes.

In at least one alternative embodiment, two peer stations may negotiate a Minimum Duration for the wakeup period. For instance, the Minimum Duration may specify an amount of time that should elapse before either station enters or returns to the power saving mode. For example, if no service period starts from either station during a wakeup period, the two stations may return to the power saving states after the minimum duration.

In another alternative embodiment, for every wakeup period, two peer stations may exchange at least one data packet exchange. For example, even though a station may not have any buffered data to transfer, the station may transmit a "NULL" data frame with an End Of Service Period (EOSP) bit set to "1". Having the EOSP bit set to "1" may positively indicate the lack of data traffic, as well as inform the other station that the peer station is alive and that the direct link between the peer stations is still active. Upon receiving the "NULL" data frame, the other peer station may send back an "ACK" frame with the More Data bit set to "0". Alternatively, the other peer station may send another "NULL" data packet with EOSP bit set to 1 so that both stations may be aware that no buffered traffic is to be transferred during the wakeup period.

In a further alternative embodiment, for each wake period, two peer stations may exchange at least one data packet. For example, regardless of the data traffic buffered, a first station may transmit a data frame with the power management (PM) bit set to 1 to notify the second station that the first station intends to return to the power saving state. Such a scenario may be desirable when, e.g., the remaining battery time of the first station is very low. Upon receiving and acknowledging the frame from the first station, the second station may not start any further frame exchanges with the first station over the direct link until the next wake period.

As one skilled in the art will appreciate, different embodiments may be combined to implement a more robust and flexible signaling protocol. Upon receiving a TDLS PSM Request frame, the receiving peer station may reply with a TDLS PSM Response frame with information defined by table 360 in FIG. 3C. In other words, Table 360 shows an example TDLS PSM Response frame. The TDLS PSM Response frame may have three fields of information. First field 365 may comprise a Link Identifier field, which may conform to section 7.3.2.z1 of 802.11z D1.0. A second field 370 may comprise a Dialog Token field that may contain a unique non-zero value corresponding to the TDLS PSM Request frame to which the PSM Response frame is responding. For example, a peer station may transmit a request frame during a negotiation represented by "03". In responding to the PSM Request frame having a Dialog Token field of "03", the responding peer station may transmit "03" as part of the Dialog Token, field 370.

Figure 3C:
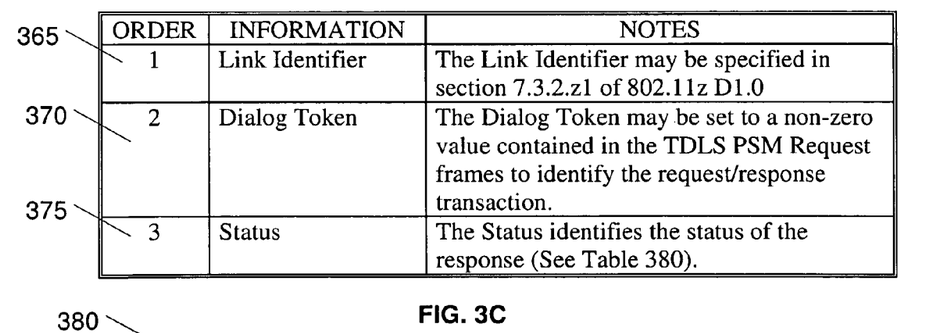
FIG. 3C shows information that may comprise a TDLS PSM Response frame.
Figure 3D:
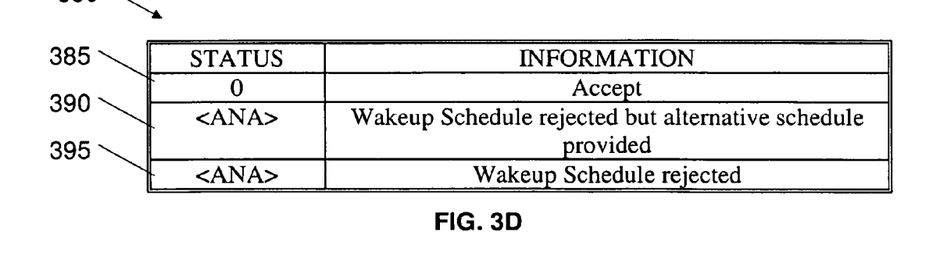
FIG. 3D depicts a table illustrating how a peer station may respond to a TDLS PSM Request.

The peer station may also transmit a third field 375 as part of the TDLS PSM Response frame. Field 375 may describe the result or status of the responding peer station. In numerous embodiments, field 375 may be defined by table 380 as shown in FIG. 3D. Table 380 illustrates different Statuses, such as how the responding peer station may respond to the PSM Request. In an embodiment, if the responding peer station agrees to enter a power saving mode and accepts the proposed wakeup schedule, the responding peer station may reply with a TDLS PSM Response having the Status set to "0", meaning the responding peer station wishes to "Accept" (element 385) the proposed wakeup schedule. If, however, the responding peer station does not want to enter the power saving mode or does not accept the proposed wakeup schedule, the responding peer station may reject the proposed wakeup schedule and provide an alternative schedule (element 390). For example, after rejecting the PSM Request, the responding peer station may continue the wakeup schedule negotiation by sending another TDLS PSM Request frame with an alternate proposal for the wakeup schedule, one which will be acceptable to the responding peer station. However, the responding station may not propose an alternate wakeup schedule and simply reject the proposed wakeup schedule (element 395), whereupon the requesting peer station could then propose another wakeup schedule.

Embodiments may employ several rules to help prevent two peer stations from negotiating a wakeup schedule for an indefinite amount of time. For example, one or more embodiments may apply three rules. First, if a peer station does not have more than one direct link, the peer station may not reject a wakeup schedule that has a higher wakeup frequency than a wakeup schedule the peer station would have proposed. Second, if a peer station has more than one direct link, the peer station may reject a wakeup schedule and propose a new wakeup schedule that is more in alignment with the existing wakeup schedule. Third, after one peer station rejects a request of another peer station, the peer station that requested the wakeup schedule may not send another TDLS PSM Request until a predefined amount of time lapses.

In various embodiments, peer stations may enter power saving modes at various times after the wakeup schedule negotiation is completed, provided the peer stations agreed on a wakeup schedule. A peer station may transmit a unicast acknowledgement frame with the power management (PM) bit set to 1 before the peer station enters the power saving mode.

Figure 4:
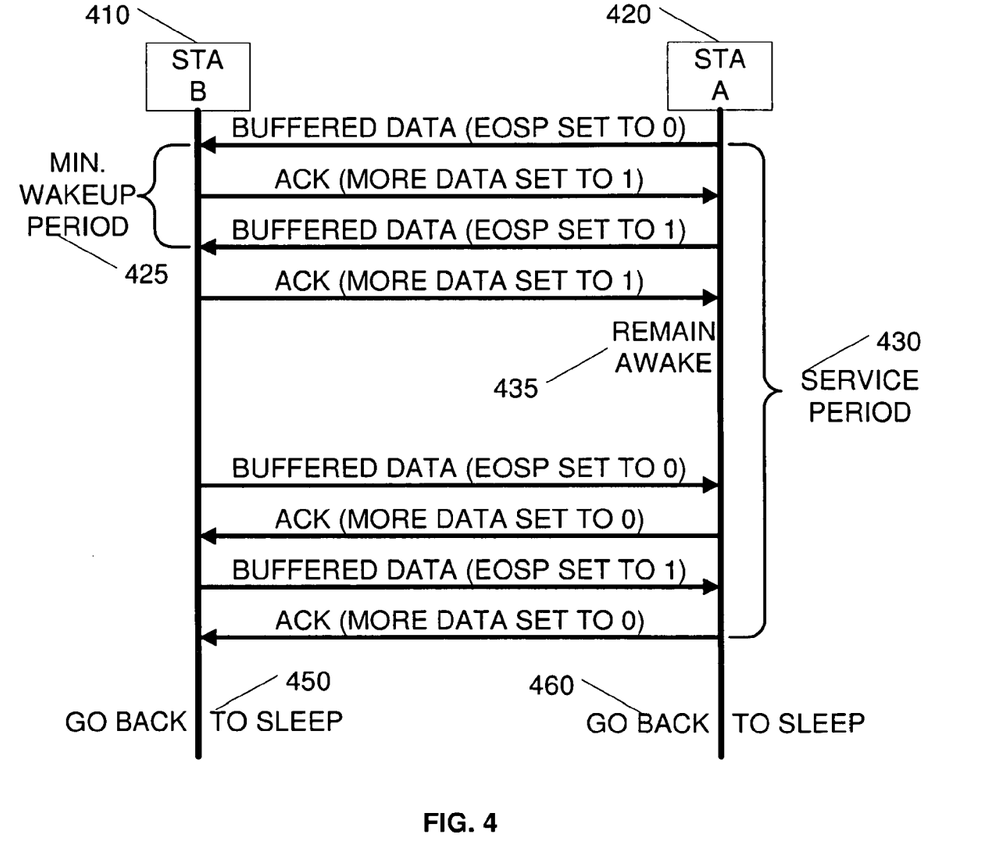
FIG. 4 illustrates how a peer power save mode may operate for two peer stations when both the EOSP bit and the More Data bit are utilized to terminate a service period.

FIG. 4 illustrates how a peer power save mode may operate for two peer stations, station 420 and station 410, when both the EOSP bit and the More Data bit are utilized to terminate a service period. First, in interpreting FIG. 4, one may assume that both peer station 420 and peer station 410 have exited the respective power saving modes at or before the scheduled wakeup Start Time. Peer station 420 and peer station 410 may stay awake for the Minimum Duration period 425 after the time specified by the scheduled wakeup Start Time. Alternatively, peer station 420 and peer station 410 may remain awake until the procedure outlined in FIG. 4 finishes successfully.

Second, peer station 420 may have buffered traffic for peer station 410. Peer station 420 may directly send buffered data frames to peer station 410. During the service period 430, one may note that peer station 420 sets the EOSP bit of all data frames from peer station 420 to 0, except the last data frame. Peer station 420 may set the EOSP bit in the last data frame to 1 to indicate that peer station 420 has no more buffered data to transmit to station 410.

Third, one may note that FIG. 4 illustrates what may be one of two different embodiments. A second, alternative embodiment will be discussed for FIG. 5. In the embodiment of FIG. 4, upon receiving the data frames from peer station 420, peer station 410 may acknowledge receiving the data frames by sending "ACK" frames with the More Data bit set to 1. By setting the More Data bit in the ACK frames to 1, peer station 410 may communicate to peer station 420 that peer station 410 also has buffered frames to be transmitted to peer station 420. Upon peer station 420 transmitting buffered frames to peer station 410 during the service period 430, peer station 420 may know that peer station 420 needs to remain awake 435 in order to receive buffered frames from peer station 410.

Peer station 410 may transfer buffered frames of data to peer station 420. One may note that peer station 410 sets the EOSP bit of all data frames from peer station 410 to 0, except the last data frame. Peer station 410 may set the EOSP bit in the last data frame to 1 to indicate that peer station 410 has no more buffered data to transmit to station 420. Additionally, one may note peer station 420 sets each acknowledgement to 0. By setting the More Data bit in the ACK frames to 0, peer station 420 may communicate to peer station 410 that peer station 420 has no more buffered frames to be transmitted to peer station 410. In other words, peer station 420 may have transferred all of the available buffered data that peer station 420 had during the service period 430.

However, peer station 420 may subsequently receive additional data that peer station 420 needs to send to peer station 410. If peer station 420 were to receive such data while peer station 410 is sending buffered data, peer station 420 may acknowledge receiving the data frames by sending an "ACK" frame with the More Data bit set to 1. In setting the More Data bit in the ACK frames to 1, peer station 420 may communicate to peer station 410 that peer station 420 has additional buffered frames to be transmitted to peer station 410.

Fourth, each peer station may transmit its frames to the other peer station while receiving the packets from the other peer station. In other words, two service periods started by peer station 420 and peer station 410, respectively, may overlap. Note further that multiple buffered packets may be delivered during such service periods.

Fifth, both peer station 420 and peer station 410 may remain awake until all buffered frames have been delivered to them. Provided that peer station 420 and peer station 410 both transfer all of the buffered data in service period 430, both peer station 420 and peer station 410 may doze, or return to the power saving modes (elements 460 and 450). For example, after both peer stations indicate the completion of data transmission by setting the EOSP bit to 1 in data frames and/or setting the More Data bit to 0 in the ACK frames, both peer stations return to the power saving modes.

Figure 5:
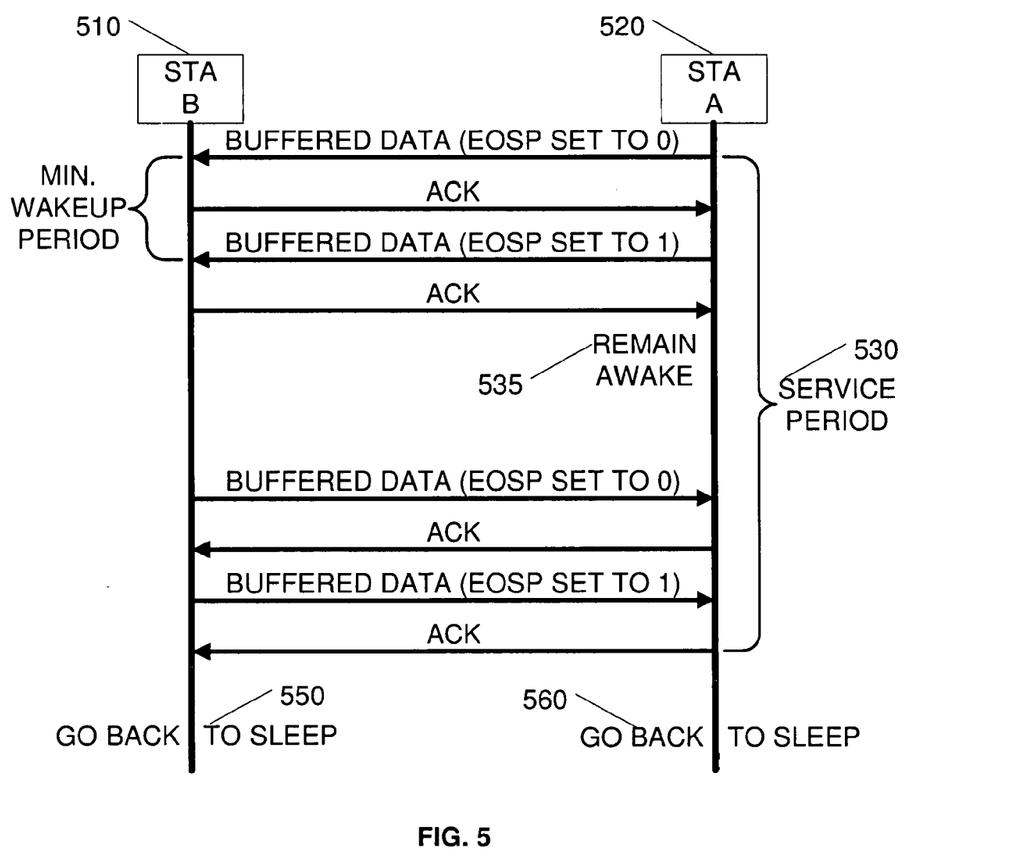
FIG. 5 illustrates how a peer power save mode may operate for two peer stations when only the EOSP bit is utilized to terminate a service period, in an alternative embodiment.

FIG. 5 illustrates what may be the second of the two different embodiments, when only the EOSP bit is utilized to terminate a service period. In this alternative embodiment, neither peer station may check the More Data bit in the "ACK" frames. Instead, first peer station 520 may remain awake (element 535) until peer station 520 receives a data frame or a NULL data frame with the EOSP bit set to 1 from peer station 510. During service period 530, peer station 510 may transmit a data frame with the EOSP bit set to 0. Upon each peer station transferring its own buffered data frames and receiving a data frame or a NULL data frame with the EOSP bit set to 1 from the other peer station, peer stations 520 and 510 may both return to the power saving modes, or doze (elements 560 and 550).

Figure 6A:
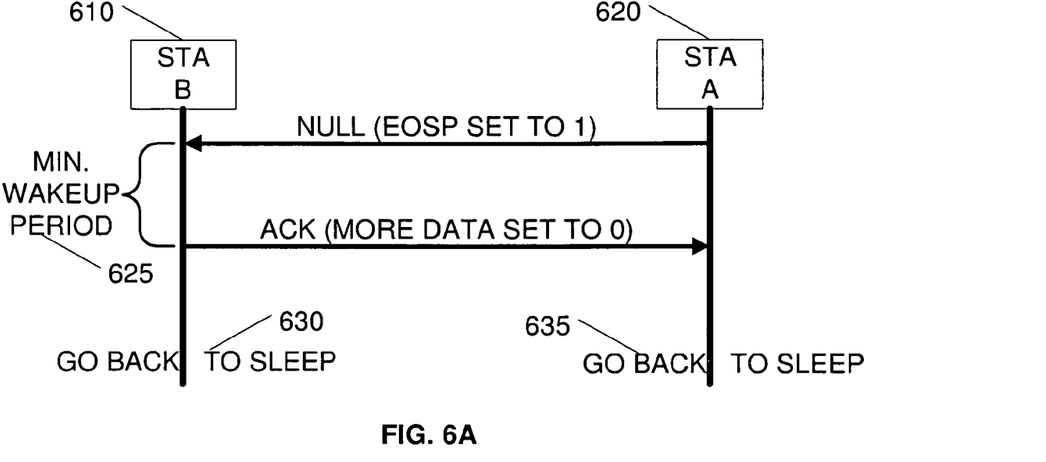
FIG. 6A illustrates that peer stations may be in power saving modes and not have buffered data to transmit to the other peer station.

FIG. 6A illustrates an alternate scenario where two peer stations may be in power saving modes, but neither peer station has buffered data to transmit to the other peer station. According to one or more embodiments, peer station 610 and peer station 620 may both be in peer power saving modes. Additionally, in this scenario, neither peer station 610 nor peer station 620 has buffered data to be transferred to the other peer station.

Both peer station 610 and peer station 620 may wake at, or before, the scheduled wakeup Start Time and stay awake for the Minimum Duration 625 after the scheduled wakeup Start Time. Alternatively, the peer stations may both stay awake until the procedure depicted in FIG. 6A finishes successfully before a Minimum Duration time. Even though peer station 620 may have no buffered data to transmit to peer station 610, peer station 620 may nonetheless send a trigger frame, such as a NULL data frame with EOSP bit set to 1, to peer station 610 to initiate a packet reception period.

As FIG. 6A illustrates, peer station 610 may also have no buffered data to transfer to peer station 620. Peer station 610 may respond differently in different embodiments. In one embodiment, peer station 610 may acknowledge the NULL data frame transmitted by peer station 620 via an ACK with the More Data bit set to 0. Upon receiving the ACK, peer station 620 may doze (element 635). Upon receiving the NULL data frame with the EOSP bit set to 1, and upon transmitting the ACK with the More Data bit set to 0, peer station 610 may also re-enter the power saving mode (element 630). In another embodiment, where neither peer station has buffered data to transfer, neither peer station may check the More Data bit in the ACK frame. Instead, peer station 610 may transmit a NULL data frame with EOSP set to 1 to explicitly inform peer station 620 that peer station 610 has no buffered data for peer station 620.

Figure 6B:
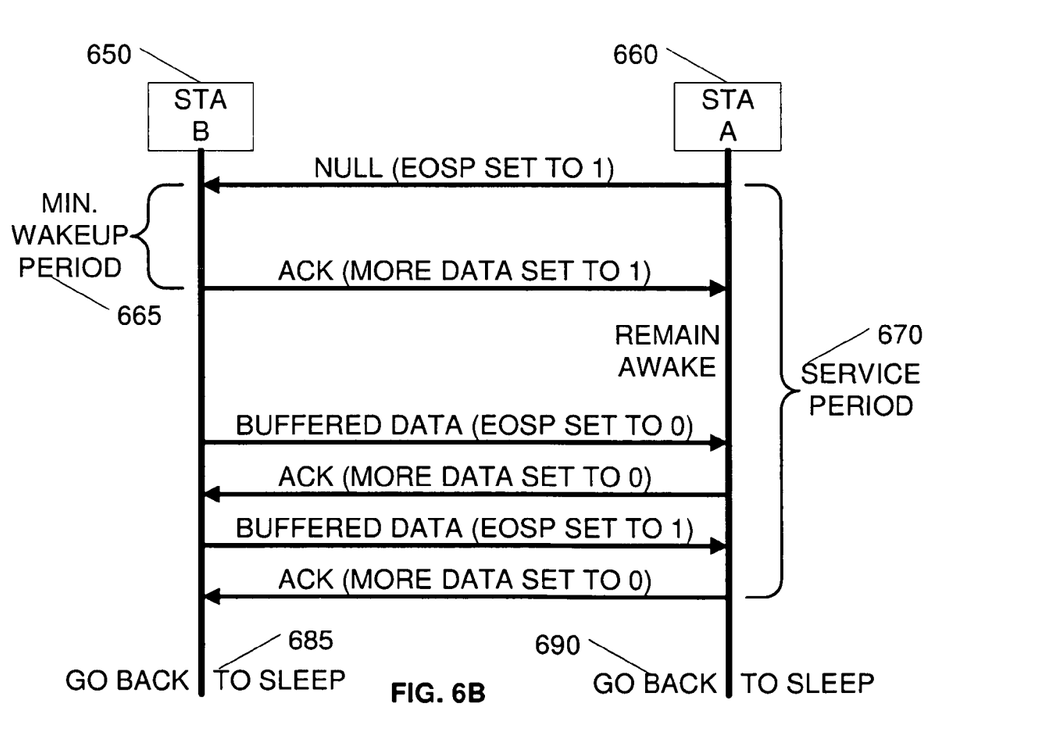
FIG. 6B illustrates that peer stations may be in power saving modes, with one station having buffered data to transmit to the other peer station.

FIG. 6B may illustrate a scenario where peer station 660 and peer station 650 are both in peer power saving modes and peer station 650 has buffered data to transfer to peer station 660. In such a scenario, both peer station 660 and peer station 650 may wake up at, or before, the scheduled wakeup Start Time and stay awake for the Minimum Duration 665 after the scheduled wakeup Start Time or when the procedure of FIG. 6B finishes successfully before a Minimum Duration time.

Even though peer station 660 does not have buffered data for peer station 650, peer station 660 may nonetheless send a trigger frame, such as a NULL data frame, to peer station 650 to initiate a packet service period 670. Upon receiving the trigger frame, peer station 650 may acknowledge it and transmit the buffered data to peer station 660. Peer station 650 may also directly transmit buffered data to peer station 660 without waiting for any trigger frame. Additionally, peer station 650 may deliver multiple buffered packets during this period.

Peer station 660 may remain awake until all buffered frames have been delivered to peer station 660. Peer station 650 may indicate completion of the data transmission by setting an EOSP bit to 1 in the final or ending data frame. Peer station 660 may acknowledge the last data frame. Again, two alternative embodiments may arise in this case because peer station 660 has no buffered data for peer station 650. Peer station 660 may either set the More Data bit in its ACK frame to 0 or transmit a NULL data frame with EOSP set to 1. Afterwards, both peer stations may doze, or go back to sleep (elements 685 and 690).

Figure 7:
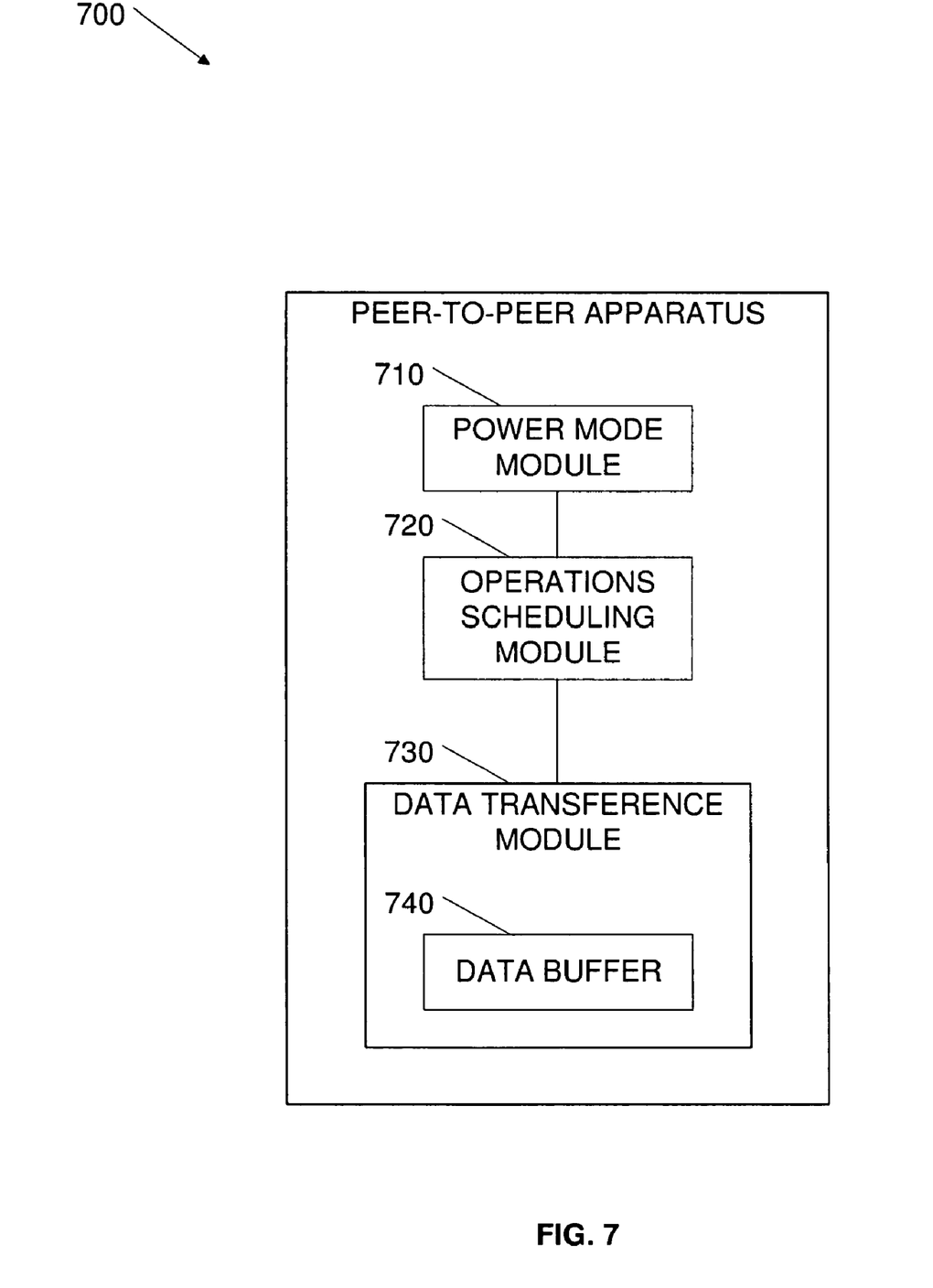
FIG. 7 depicts one embodiment of an apparatus that may enable saving power for a communication device.

FIG. 7 depicts one embodiment of an apparatus 700 that may enable saving power for a communication device, such as systems or devices associated with peer-to-peer wireless communication networks. One or more elements of apparatus 700 may be in the form of hardware, software, or a combination of both hardware and software. For example, in the embodiment depicted in FIG. 7, the modules of apparatus 700 may exist as instruction-coded modules stored in a memory device. For example, the modules may comprise software or firmware instructions of an application, executed by one or more processors. In other words, apparatus 700 may comprise elements of a computing device coupled to hardware elements.

In alternative embodiments, one or more of the modules of apparatus 700 may comprise hardware-only modules. For example, power mode module 710 may comprise a portion of an integrated circuit chip coupled with power switching elements for processors of a computing device. In such embodiments, power mode module 710 may work in conjunction with operations scheduling module 720 to switch between two or more power modes according to scheduling of operations scheduling module 720.

In even further alternative embodiments, one or more of the modules of apparatus 700 may comprise a combination of hardware and software modules. For example, data transference module 730 may comprise firmware and a standalone processing circuit that performs the monitoring and management of data for data buffer 740. In more detail, data transference module 730 may retrieve data from data buffer 740 and transfer the data to another peer station via a wireless communications device. Data transference module 730 may also monitor the wireless communications device for data transmissions from other peer stations and store received data to data buffer 740.

Power mode module 710 may control or otherwise affect switching between one or more power saving modes of a communication device, such as a peer station. For example, power mode module 710 may comprise one or more portions of processor 150, shown in FIG. 1, which conserves varying amounts of power by selectively shutting down varying numbers of cores in cores 152. Depending on how many cores of cores 152 are shut down, or how much the processing activities are reduced such as by decreasing the processing frequencies of the cores, system 100 may also be unable to communicate with another device. That is to say, the cores of cores 152 may be operating in such a manner that is unable to support communications via communications device 192. Alternatively, power mode module 710 may comprise ASIC 114. In such an alternative embodiment, power mode module 710 may control the power to various elements of system 100, such as elements of processor 150 and individual peripheral devices, including communications device 192.

Power mode module 710 may work in conjunction with operations scheduling module 720 and data transference module 730 to enable saving power for a communication device or system. In one or more embodiments operations scheduling module 720 may comprise a collection of program instructions stored in a tangible medium and executed by one or more processors, such as instructions stored in memory 102 of FIG. 1, executed by processor 150. After system 100 establishes a direct link with a peer station, the program instructions for operations scheduling module 720 may cause system 100 to communicate with the peer station, such as via communication device 192, and negotiate a wakeup schedule IE. For instance, the program instructions for operations scheduling module 720 may transmit and/or receive a series of TDLS PSM Requests and TDLS PSM Responses. The PSM Requests and PSM Responses may, e.g., be formatted according to the tables of FIGS. 3A, 3B, 3C, and 3D.

Data transference module 730 may comprise a collection of program instructions stored in a tangible medium and executed by one or more processors that cause data to be transferred to and from data buffer 740. For instance, data transference module 730 may comprise instructions stored in memory 102 of FIG. 1, executed by processor 150 that cause data to be stored in RAM of communications device 192, as well as cause data to be retrieved from the RAM, and which transfer the data to/from the peer station coupled to system 100 via the established direct link of communications device 192.

The number of modules in an embodiment of apparatus 700 may vary. Some embodiments may have fewer modules than those module depicted in FIG. 7. For example, one embodiment may integrate the functions described and/or performed by power mode module 710 with the functions of operations scheduling module 720 into a single module. Further embodiments may include more modules or elements than the ones shown in FIG. 7. For example, alternative embodiments may include two or more power mode modules 710 and two or more data transference modules 730.

Figure 8:
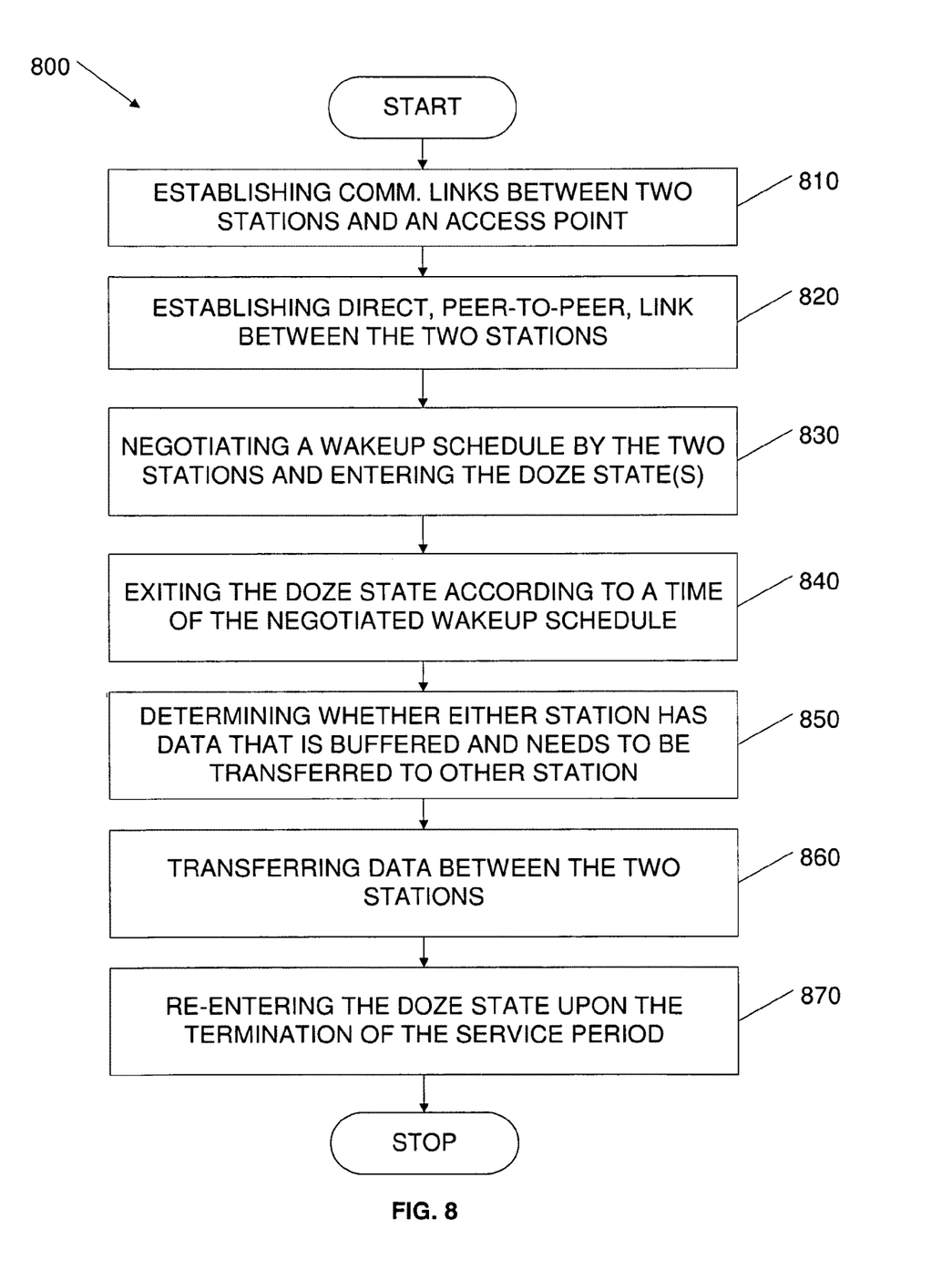
FIG. 8 illustrates a method for saving power of peer-to-peer communication devices, such as devices associated with wireless communication networks.

FIG. 8 depicts a flowchart 800 illustrating a method for saving power of peer-to-peer communication devices, such as devices associated with wireless communication networks. Flowchart 800 begins with establishing communication links between communication stations and an access point (element 810). For example, two users of two ultra mobile internet devices (MIDs) may enter a coffee shops having Internet access for customers of the coffee shop. The users may each use their MID to log onto the Internet, read e-mail, and chat with friends. While online, each user may also enter an online chat session. Note that while the embodiment of flowchart 800 may involve only one access point, alternative embodiments may involve multiple access points and additional communication stations. For example, an alternative embodiment may include a third person using a laptop computer in her apartment, connecting to the Internet via the Internet service provider of the user and joining the poker tournament or the chat session.

Upon establishing communication links between the MIDs and an access point (element 810), an embodiment according to flowchart 800 may continue by establishing direct, peer-to-peer links between the two stations (element 820). Continuing with the previous example, the two users may decide to enter a personal chat session with each other, via a direct communication link of a TDLS network. For instance, the users may decide to send messages and other information directly between the two MIDs, instead of relying on the access point or Internet service provider of the coffee shop. Each MID may connect to the other MID, and transfer the information directly to the other MID, without relying on the access point.

Upon establishing the peer-to-peer link between the two MIDs (element 820), the method embodiment of flowchart 800 may continue by negotiating a wakeup schedule by the two stations and entering a doze state (element 830). Note that each state may technically enter a different doze "state" depending on the nature of the device. Again, continuing with the previous example, the users may both strike up conversations in the coffee shop, letting the MIDs remain idle for several minutes. The MIDs may detect such inactivity and, in an effort to extend the lives of the batteries of the MIDs, communicate with each other and negotiate with each other to develop a commonly acceptable wakeup schedule. For instance, both MIDs may exchange a series of wakeup schedule information elements and agree to enter a doze state. The wakeup schedule may specify that each MID should wake in three minutes, according to TSF time, and check for additional communication activity from the other MID (element 840). Even while entering the doze state, however, each MID may not sign off of the direct, peer-to-peer, link. Additionally, depending on the embodiment, each MID may also not sign off of the communications link with the access point.

In many embodiments, two stations may agree upon a specific time to wake and exchange packets of data (element 840). The two stations may each select a specific time that each station should exit the doze or power conservation mode and exchange data or otherwise check with the other station to determine that no data needs to be transferred (element 850). Upon waking and exchanging the data (element 860), or determining that no data needs to be transferred, each station may also remain awake for a specific interval of time. After the termination of the service period each station may return or re-enter the doze state (element 870).

The wakeup negotiation in different embodiments may vary. For instance, in many embodiments the wakeup negotiation between two peer stations may involve one station proposing a specific time for both stations to wake, an amount of time that specifies how long both stations should remain awake after exiting the power saving modes, and a period of time that specifies how much time should elapse between successive wakeup periods. In some embodiments, the station receiving the proposed wakeup schedule may be able to reject the proposed schedule and propose an alternative schedule. In some alternative embodiments, however, the station receiving the proposed wakeup schedule may only be able to reject the proposed schedule, without having the ability to propose an alternative. In even further embodiments, the station receiving the proposed wakeup schedule may be able to reject the proposed schedule and provide information to the requesting station as to why the proposed schedule is being rejected. For instance, the receiving station may provide reasons such as "currently busy—unable to enter PSM", "wake interval conflict", "PSM disabled by user", or "battery power low". Based on the information provided by the receiving station, the requesting station may be able adjust the wakeup schedule proposal in a manner acceptable to the receiving station, or cancel future requests.

In even further embodiments, the peer stations may negotiate more elements as part of the wakeup schedule. For example, the stations may agree to one sleep-wake interval of three minutes for a period of an hour, and then a second sleep-wake interval of five minutes thereafter. Alternatively, the wakeup schedule information may include data that affects the interval or duration times. For example, in one embodiment, the peer stations may agree to a wakeup schedule that specifies that the interval should change between one, three, five, and ten minutes based on the amount of data transferred during the previous wake duration. As a specific example, the wakeup period may specify that the next interval may be reduced to smaller increments of time, such as from five minutes to three minutes, based on the amount of data buffered and/or transferred during the previous wake duration. Similarly, the wakeup period may specify that the next interval may be increased to larger increments of time, such as from five to ten minutes, if the amount of data transferred during the previous wake duration was relatively large. In other words, the wakeup schedule may include information that allows parameters of the schedule to dynamically change based on the amount of traffic, such as to adapt to varying traffic demands.

One embodiment describes a system comprising: memory to store a wakeup schedule and buffered data, wherein the memory comprises dynamic random access memory (DRAM); a wireless communication device coupled to the memory, wherein the wireless communication device is arranged to transfer the buffered data between the system and a peer station via a direct link of a tunneled direct link setup (TDLS) network; and an operations scheduling module to negotiate the wakeup schedule, wherein the wakeup schedule comprises an interval specifying when the system and the peer station will periodically exit power saving modes to transfer the buffered data and re-enter the power saving modes.

Another embodiment may be implemented as a program product stored in a tangible medium for use with a system to perform processes, such as the processes described in conjunction with system 100 illustrated in FIG. 1. The program (s) of the program product defines functions of the embodiments (including the methods described herein) and may be contained on a variety of data-bearing media. Illustrative data-bearing media include, but are not limited to: (i) information permanently stored on non-writable storage media (e.g., read-only memory devices within a computer such as CD-ROM disks readable by a CD-ROM drive); and (ii) alterable information stored on writable storage media (e.g., floppy disks within a diskette drive or hard-disk drive). Such data-bearing media, when carrying computer-readable instructions that direct the functions of devices or systems, represent embodiments of the present invention.

In general, the routines executed to implement the embodiments, may be part of an operating system or a specific application, component, program, module, object, or sequence of instructions. The computer program of an embodiment may be comprised of a multitude of instructions that will be translated by a computer into a machine-readable format and hence executable instructions. Also, programs may be comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus a specific embodiment should not be limited to use solely in any specific application identified and/or implied by such nomenclature.

It will be apparent to those skilled in the art having the benefit of this disclosure that the embodiments herein contemplate systems, apparatuses, methods, and computer program products to save power for peer-to-peer communication devices, such as devices associated with wireless communication networks. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A method, comprising:
    negotiating, by a first station with a second station, a wakeup schedule for the first station and the second station to exchange data, wherein the negotiating is via a direct link between the first station and the second station, wherein further the direct link comprises a wireless peer-to-peer link of a tunneled direct link setup (TDLS) network, the negotiating comprising:
    determining by the first station an acceptable wakeup frequency of another wakeup schedule; and
    accepting by the first station the wakeup schedule, wherein the wakeup schedule was proposed by the second station, and the wakeup schedule contains a higher wakeup frequency than the wakeup frequency of the other wakeup schedule pursuant to a rule requiring the first station to accept a wakeup schedule proposed by a peer station, wherein the first station determined an acceptable wakeup schedule and the peer station proposes a wakeup schedule with a higher wakeup frequency than the acceptable wakeup schedule;
    entering by the first station a first mode of power saving according to the wakeup schedule while the second station is in a second mode of power saving; and
    exiting by the first station the first mode based on the wakeup schedule.

2. The method of claim 1, wherein the negotiating the wakeup schedule comprises negotiating values for a start time of a wakeup window, a duration of a wakeup window, and an interval between successive wakeup windows.

3. The method of claim 2, wherein:
    the first station and the second station have established communication links with an access point; and
    the negotiating comprises agreeing upon the start time, the start time not a gcd of the interval between successive wakeup windows and a beacon interval of the access point.

4. The method of claim 1, further comprising:
    establishing by the first station a direct link with a third station;
    receiving, by the first station from the third station, a proposed wakeup schedule with a higher wakeup frequency than the wakeup frequency of the wakeup schedule;
    rejecting by the first station the proposed wakeup schedule; and
    proposing a third wakeup schedule more in alignment with the wakeup schedule pursuant to a rule allowing the first station to reject a wakeup schedule proposed by a peer station in order to have a wakeup schedule more in alignment with a wakeup schedule currently in effect.

5. The method of claim 1, further comprising:
    rejecting, by the first station, another wakeup schedule proposed by the second station; and
    providing, by the first station to the second station, reasons for the rejection of the other wakeup schedule proposed by the second station.

6. The method of claim 1, further comprising:
    proposing, by the first station, before receiving the wakeup schedule from the second station, a wakeup schedule;
    receiving, by the first station from the second station, a rejection of the proposed wakeup schedule; and
    refraining from proposing an alternative wakeup schedule for an interval of time pursuant to a rule requiring the first station to refrain from proposing a wakeup schedule for a fixed interval of time after receiving a rejection.

7. The method of claim 1, wherein:
    the negotiating comprises:
    transmitting by the first station to the second station a first request frame comprising a unique identifier; and
    transmitting by the first station to the second station a subsequent request frame, comprising a field referencing the unique identifier of the first request frame, in response to the first station not receiving from the second station a reply to the first request frame.

8. An apparatus, comprising:
a power mode module to enable a communication device to switch to a power saving mode and to resume full-power operations;
a data transference module to transfer data between the communication device and a second communication device, wherein the data transference module is to transfer data via a direct link between the communication device and the second communication device, wherein further the direct link comprises a wireless link of a tunneled direct link setup (TDLS) network; and
an operations scheduling module to negotiate a wakeup schedule of the communication device, wherein the wakeup schedule comprises:
a start time for the communication device to exit the power saving mode and for the second communication device to exit a second power saving mode;
one or more positive durations of a wakeup window; and
one or more intervals between successive wakeup windows, wherein:
the wakeup schedule comprises either two or more positive durations of a wakeup window or two or more intervals between successive wakeup windows;
the wakeup schedule comprises conditions for switching from a first positive duration of a wakeup window to a second positive duration or for switching from a first interval between successive wakeup windows to a second interval between successive wakeup windows; and
the power mode module is to enable the communication device to switch to a power saving mode pursuant to the negotiated wakeup schedule and to resume full-power operations for a duration of a wakeup window of the wakeup schedule.

9. The apparatus of claim 8, further comprising a clock to enable the operations scheduling module to determine when a start time of a wakeup window arrives.

10. The apparatus of claim 8, wherein:
the one or more intervals between successive wakeup windows comprise a first interval between wakeup windows and a second interval between wakeup windows; and
the operations scheduling module is to dynamically select between the first interval and the second interval based on an amount of data transferred between the communication device and the second communication device.

11. The apparatus of claim 10, wherein the operations scheduling module is to select a second wakeup schedule proposed by the second communication device.

12. The apparatus of claim 8, wherein:
the one or more positive durations of a wakeup window comprise a first positive duration of a wakeup window and a second positive duration of a wakeup window; and
the operations scheduling module is to dynamically select between the first positive duration of a wakeup window and the second positive duration of a wakeup window based on an amount of data transferred between the communication device and the second communication device.

13. The apparatus of claim 8, wherein:
the one or more intervals between successive wakeup windows comprise a first interval between successive wakeup windows and a second interval between successive wakeup windows; and
the wakeup schedule is to schedule the first interval between successive wakeup windows for a first period of time and to schedule the second interval between successive wakeup windows for a second period of time.

14. The apparatus of claim 8, wherein the data transference module is to transfer to the second communication device an acknowledgement of a data frame received from the second communication device during a wakeup window, the acknowledgement to contain a data field indicating whether the first communication device has data to transfer to the second communication device during the wakeup window.

15. The apparatus of claim 8, wherein the data transference module is to transmit at least one frame of data to the second communication device during each wakeup window pursuant to a policy requiring the transmission of at least frame of data during each wakeup window.

16. A system, comprising:
memory to store a wakeup schedule and buffered data, wherein the memory comprises dynamic random access memory (DRAM);
a wireless communication device coupled to the memory, wherein:
the wireless communication device is arranged to transfer the buffered data between the system and a peer station via a direct link of a tunneled direct link setup (TDLS) network; and
the wireless communication device comprises a power mode module to enable the wireless communication device to switch to a power saving mode and to resume full-power operations; and
an operations scheduling module to negotiate the wakeup schedule, wherein the wakeup schedule comprises:
a start time for the wireless communication device to exit a power saving mode and for the second communication device to exit a second power saving mode;
one or more positive durations of a wakeup window; and
one or more intervals between successive wakeup windows, wherein:
the wakeup schedule comprises conditions for switching from a first positive duration of a wakeup window to a second positive duration or for switching from a first interval between successive wakeup windows to a second interval between successive wakeup windows; and
the power mode module is to enable the communication device to switch to a power saving mode pursuant to the negotiated wakeup schedule and to resume full-power operations for a duration of a wakeup window of the wakeup schedule.

17. The system of claim 16, wherein the operations scheduling module comprises an application specific integrated circuit (ASIC).

18. The system of claim 16, wherein:
the one or more positive durations of a wakeup window comprise a first positive duration of a wakeup window and a second positive duration of a wakeup window; and
the operations scheduling module is arranged to dynamically select between the first positive duration of a wakeup window and the second positive duration of a wakeup window based on an amount of data transferred between the wireless communication device and the peer station.

19. The system of claim 16, wherein:
the one or more intervals between successive wakeup windows comprise a first interval between successive wakeup windows and a second interval between successive wakeup windows; and
the wakeup schedule is to schedule the first interval between successive wakeup windows for a first period of time and to schedule the second interval between successive wakeup windows for a second period of time.

20. The system of claim 16, wherein the wireless communication device is to transfer to the peer station an acknowledgement of a data frame received from the peer station during a wakeup window, the acknowledgement to contain a data field indicating whether the wireless communication device has data to transfer to the peer station during the wakeup window.

21. The system of claim 16, wherein the wireless communication device is to transmit at least one frame of data to the peer station during each wakeup window pursuant to a policy requiring the transmission of at least frame of data during each wakeup window.

22. A computer program product comprising:
a computer readable tangible storage medium, wherein the storage medium does not comprise a transitory signal, wherein the storage medium includes instructions that, when executed by a processor:
buffer data to be transferred from a first peer station to a second peer station, wherein transference of the buffered data is via a direct link of a tunneled direct link setup (TDLS) network, wherein further the direct link comprises a wireless link; and
negotiate a wakeup schedule, the negotiating comprising:
determining by the first peer station an acceptable wakeup frequency of another wakeup schedule; and
accepting by the first peer station the wakeup schedule, wherein the wakeup schedule was proposed by the second peer station, and the wakeup schedule contains a higher wakeup frequency than the wakeup frequency of the other wakeup schedule pursuant to a rule requiring the first peer station to accept a wakeup schedule proposed by a peer station, wherein the first peer station determined an acceptable wakeup schedule and the peer station proposes a wakeup schedule with a higher wakeup frequency than the acceptable wakeup schedule, wherein the wakeup schedule specifies a time that the first peer station and the second peer station are to exit doze states to transfer the buffered data.

23. The computer program product of claim 22, further comprising instructions that maintain the direct link after the first peer station enters a first doze state and the second peer station enters a second doze state.

24. The computer program product of claim 22, wherein the instructions that negotiate the wakeup schedule comprises instructions that transmit a TDLS power save mode (PSM) request frame, wherein further the TDLS PSM request frame comprises a wakeup schedule information element with an element identification field, a length field, a start time field to indicate a start time of a wakeup window, an interval field to indicate an interval between successive wakeup windows, a duration of awake window field, and an idle count field.

25. The computer program product of claim 22, further comprising instructions that:
establish by the first peer station a direct link with a third peer station;
receive, by the first peer station from the third peer station, a proposed wakeup schedule with a higher wakeup frequency than the wakeup frequency of the wakeup schedule; and
propose by the first peer station a third wakeup schedule more in alignment with the wakeup schedule pursuant to a rule allowing the first peer station to reject a wakeup schedule proposed by a peer station in order to have a wakeup schedule more in alignment with a wakeup schedule currently in effect.

* * * * *